US009639079B2

(12) United States Patent
Sakai

(10) Patent No.: US 9,639,079 B2
(45) Date of Patent: May 2, 2017

(54) NUMERICAL CONTROL DEVICE AND MACHINING METHOD

(71) Applicant: Yu Sakai, Tokyo (JP)

(72) Inventor: Yu Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 116 days.

(21) Appl. No.: 14/765,381

(22) PCT Filed: Feb. 22, 2013

(86) PCT No.: PCT/JP2013/054514
§ 371 (c)(1),
(2) Date: Aug. 3, 2015

(87) PCT Pub. No.: WO2014/128916
PCT Pub. Date: Aug. 28, 2014

(65) Prior Publication Data
US 2015/0378349 A1  Dec. 31, 2015

(51) Int. Cl.
*G05B 19/408* (2006.01)
*G05B 19/18* (2006.01)

(52) U.S. Cl.
CPC .......... *G05B 19/408* (2013.01); *G05B 19/18* (2013.01); *G05B 2219/45136* (2013.01)

(58) Field of Classification Search
CPC .................. G05B 19/408; G05B 19/18; G05B 2219/45136
See application file for complete search history.

(56) References Cited

U.S. PATENT DOCUMENTS 3,656,377 A * 4/1972 Kosem ................. G05B 19/182
318/39
4,878,172 A * 10/1989 Matsumura ...... G05B 19/40937
700/181
(Continued)

FOREIGN PATENT DOCUMENTS

EP       0 265 525 A1    5/1988
JP       60-62439 A      4/1985
(Continued)

OTHER PUBLICATIONS

International Search Report of PCT/JP2013/054514, dated May 14, 2013. [PCT/ISA/210].
(Continued)

*Primary Examiner* — Ramesh Patel
(74) *Attorney, Agent, or Firm* — Sughrue Mion, PLLC; Richard C. Turner

(57) ABSTRACT

A numerical control device includes: a memory storing in advance angular difference information between each of first cutting shafts formed for an upper tool post and a second cutting shaft of a lower tool post and a machining program including a movement command for the upper tool post to move an imaginary shaft, which moves along the same line as the second cutting shaft and performs cutting from a direction opposite to the second cutting shaft with respect to the main shaft; a shaft-command distribution processing unit distributing the movement command to move the imaginary shaft to the first cutting shaft components based on the angular difference information; and a shaft-synchronization processing unit driving the first cutting shafts based on the movement command distributed to the first cutting shaft components and driving the second cutting shaft by the movement amount same as that in the direction of the imaginary shaft.

4 Claims, 7 Drawing Sheets

(56) References Cited

U.S. PATENT DOCUMENTS

| | | | | |
|---|---|---|---|---|
| 4,887,345 | A * | 12/1989 | Saito | B23Q 3/15713 29/40 |
| 5,888,037 | A * | 3/1999 | Fujimoto | G05B 19/416 408/1 R |
| 6,909,939 | B1 * | 6/2005 | Yamada | G05B 19/19 700/189 |
| 2001/0052757 | A1 * | 12/2001 | Sugiyama | G05B 19/182 318/569 |
| 2007/0007926 | A1 * | 1/2007 | Iwashita | G05B 19/4141 318/625 |
| 2012/0197424 | A1 * | 8/2012 | Kimura | G05B 19/184 700/103 |
| 2014/0102268 | A1 * | 4/2014 | Hariki | B23B 29/125 82/118 |
| 2014/0156052 | A1 * | 6/2014 | Nishibashi | G05B 19/4103 700/112 |
| 2014/0236340 | A1 * | 8/2014 | Terada | G05B 19/182 700/160 |

FOREIGN PATENT DOCUMENTS

| | | |
|---|---|---|
| JP | 62-255046 A | 11/1987 |
| JP | 1-32021 B2 | 6/1989 |
| JP | 2-124201 A | 5/1990 |
| JP | 5-245701 A | 9/1993 |
| JP | 5-85301 B2 | 12/1993 |
| JP | 8-106311 A | 4/1996 |
| JP | 9-150348 A | 6/1997 |
| JP | 2002-1632 A | 1/2002 |
| JP | 2002-341915 A | 11/2002 |
| JP | 2007-105820 A | 4/2007 |
| JP | 2007-234002 A | 9/2007 |
| JP | 2009-294868 A | 12/2009 |
| JP | 2012-152883 A | 8/2012 |
| WO | 02/27417 A1 | 4/2002 |

OTHER PUBLICATIONS

Communication dated Nov. 2, 2016, from the State Intellectual Property Office of the P.R.C., in counterpart Chinese application No. 201380073481.2.

* cited by examiner

NUMERICAL CONTROL DEVICE AND MACHINING METHOD

CROSS REFERENCE TO RELATED APPLICATIONS

This application is a National Stage of International Application No. PCT/JP2013/054514 filed Feb. 22, 2013, the contents of all of which are incorporated herein by reference in their entirety.

FIELD

The present invention relates to a numerical control (NC) device that numerically controls a machine tool that performs turning by using two tool posts that oppose each other with a main shaft therebetween and a machining method performed by the NC device.

BACKGROUND

Turning is machining performed by rotating a workpiece attached to a main shaft and pressing a cutting tool attached to a tool post against the workpiece. When the workpiece is long, a minute distortion may be generated in the workpiece due to the machining load caused by the cutting tool being pressed against the workpiece and thus the cylindricity may be reduced. In view of this problem, there is a technology in which, when machining is performed by using a machine tool having upper and lower tool posts, balance cutting, in which the cutting tools are pressed against a workpiece from the upper and lower sides, is performed, whereby the machining loads caused by the cutting tools being pressed against the workpiece are canceled out and the cylindricity is improved (for example, see Patent Literature 1).

Moreover, with this technology, because the machining loads from the upper and lower tool posts can be made equal by performing balance cutting, the cutting feed speed can be doubled and thus the machining time can be shortened.

CITATION LIST

Patent Literature

Patent Literature 1: Japanese Patent Application Laid-open No. H09-150348

SUMMARY

Technical Problem

However, in order to make the machining loads from the upper and lower tool posts equal, it is necessary that the moving directions of the cutting shafts of the upper and lower tool posts are aligned. Accordingly, with a machine tool that has a mechanical configuration in which the moving directions of the cutting shafts of the upper and lower tool posts are not aligned, the machining loads cannot be made equal. Therefore, there is a problem in that the requirement of balance cutting cannot be satisfied.

The present invention has been achieved in view of the above and an object of the present invention is to obtain a numerical control device that realizes balance cutting by numerically controlling a machine tool in which the moving directions of the cutting shafts of two tool posts that oppose each other with a main shaft therebetween are not aligned and a machining method performed by using the numerical control device.

Solution to Problem

In order to solve the above problems and achieve the object, an aspect of the present invention is a numerical control device controlling a machine tool that includes two tool posts opposing each other with a main shaft therebetween, in which one tool post among the two tool posts includes a plurality of first cutting shafts that are perpendicular to the main shaft, in which another tool post among the two tool posts includes one second cutting shaft that is perpendicular to the main shaft, and in which each of the first cutting shafts and the second cutting shaft are arranged such that there is an angular difference between each of the first cutting shafts and the second cutting shaft, the device including: a memory that stores in advance angular difference information on an angular difference between each of the first cutting shafts and the second cutting shaft and a machining program that includes a movement command for the one tool post to move an imaginary shaft, which moves along a same line as the second cutting shaft and performs cutting from a direction opposite to the second cutting shaft with respect to the main shaft; a shaft-command distribution processing unit that distributes a movement command to move the imaginary shaft to the first cutting shaft components in accordance with the angular difference information; and a shaft-synchronization processing unit that causes the one tool post to perform cutting in a direction of the imaginary shaft by driving each of the first cutting shafts in accordance with each movement command distributed to the first cutting shaft components and causes the another tool post to perform cutting in a direction opposite to the direction of the imaginary shaft by driving the second cutting shaft by a movement amount same as a movement amount in the direction of the imaginary shaft.

Advantageous Effects of Invention

The numerical control device according to the present invention can cause the cutting shaft that moves along the same line as the imaginary shaft among the cutting shafts formed for the tool post opposed to the tool post for which the imaginary shaft is formed to perform cutting by the same movement amount as the imaginary shaft in a direction opposite to the imaginary shaft in synchronization with the imaginary shaft; therefore, a machine tool in which the moving directions of the cutting shafts of two tool posts that oppose each other with a main shaft therebetween are not aligned can be numerically controlled to realize balance cutting.

DESCRIPTION OF EMBODIMENTS

Exemplary embodiments of a numerical control device and a machining method according to the present invention will be explained below in detail with reference to the drawings. This invention is not limited to the embodiments.

Embodiment

Figure 1:
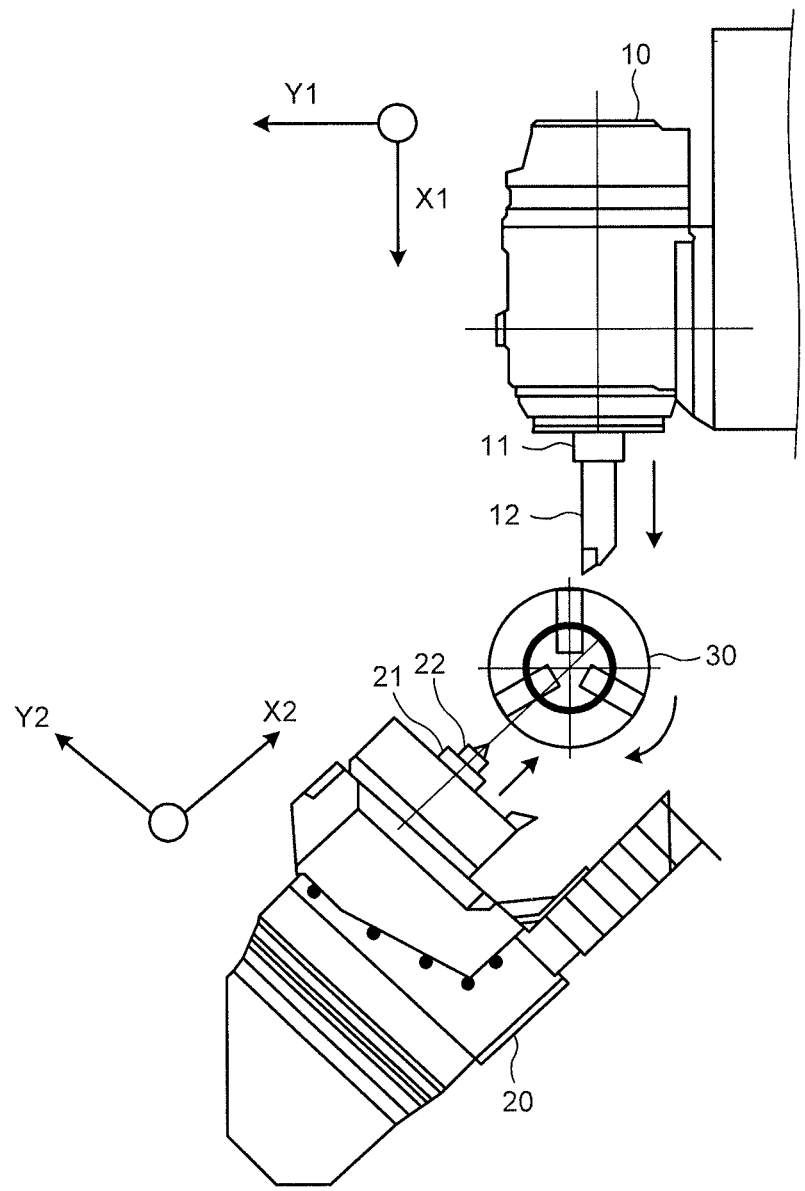
FIG. 1 is a diagram explaining the mechanical configuration of a machine tool in which the directions of the cutting shafts of the upper and lower tool posts are not aligned.
Figure 2:
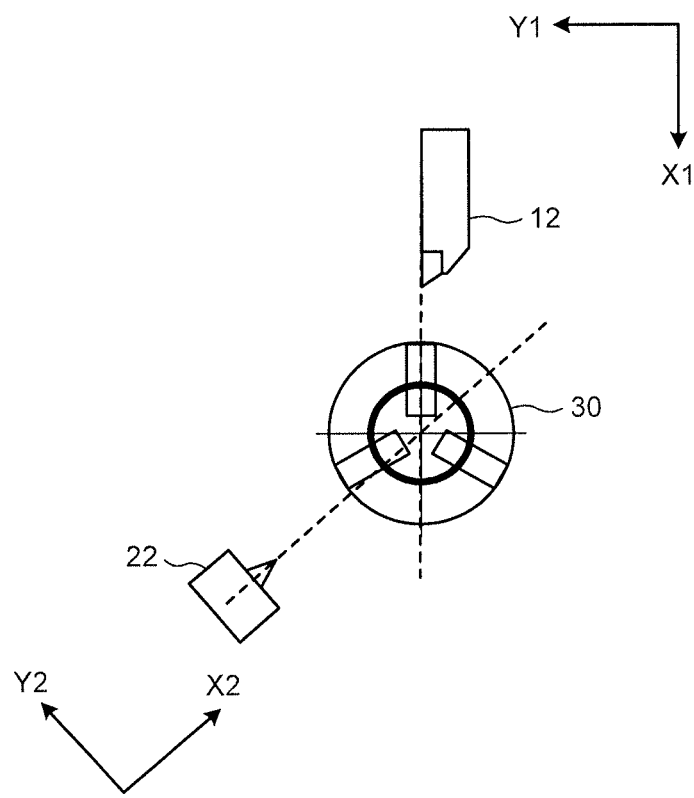
FIG. 2 is a diagram explaining the mechanical configuration of a machine tool in which the directions of the cutting shafts of the upper and lower tool posts are not aligned.

FIG. 1 and FIG. 2 are diagrams explaining the mechanical configuration of a machine tool in which the directions of the cutting shafts of the upper and lower tool posts are not aligned. As illustrated in FIG. 1, the machine tool includes an upper-tool-post driving unit 10 for machining a workpiece from the upper side of a main shaft 30, which rotates the workpiece around the shaft line that is perpendicular to the paper surface, and a lower-tool-post driving unit 20 for machining a workpiece from the lower side of the main shaft 30. The upper-tool-post driving unit 10 can position an upper tool post 11, to which a cutting tool 12 is fixed, in an X1-shaft direction and a Y1-shaft direction. The lower-tool-post driving unit 20 can position a lower tool post 21, to which a cutting tool 22 is fixed, in an X2-shaft direction and a Y2-shaft direction. In other words, the upper tool post 11 and the lower tool post 21 are arranged such that they oppose each other with the main shaft 30 therebetween. As illustrated in FIG. 2, neither the direction of the cutting shaft X1 of the upper tool post 11 nor the direction of the cutting shaft Y1 of the upper tool post 11 is aligned with the direction of the cutting shaft X2 of the lower tool post 21.

Figure 3:
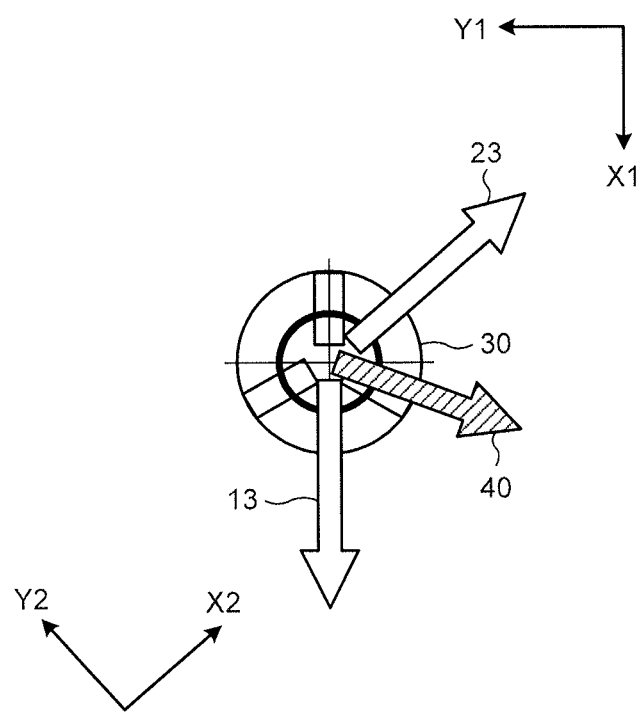
FIG. 3 is a diagram explaining the machining loads applied to a workpiece when the workpiece is machined by using the upper and lower tool posts at the same time.

FIG. 3 is a diagram explaining the machining loads applied to a workpiece when the workpiece is machined by using the upper and lower tool posts 11 and 21 at the same time in such a machine tool. As illustrated in FIG. 3, because a vector 13 of the machining load generated by the cutting tool 12 and a vector 23 of the machining load generated by the cutting tool 22 are not aligned, the machining loads do not cancel each other out and thus the vectors 13 and 23 are combined so as to generate the machining load expressed by a vector 40. Therefore, when the upper and lower tool posts 11 and 21 are caused to perform cutting in the cutting-shaft directions by using the machine tool having the configuration illustrated in FIG. 1, the workpiece is distorted because of the machining load expressed by the vector 40 and thus the cylindricity when turning is performed is reduced.

Figure 4:
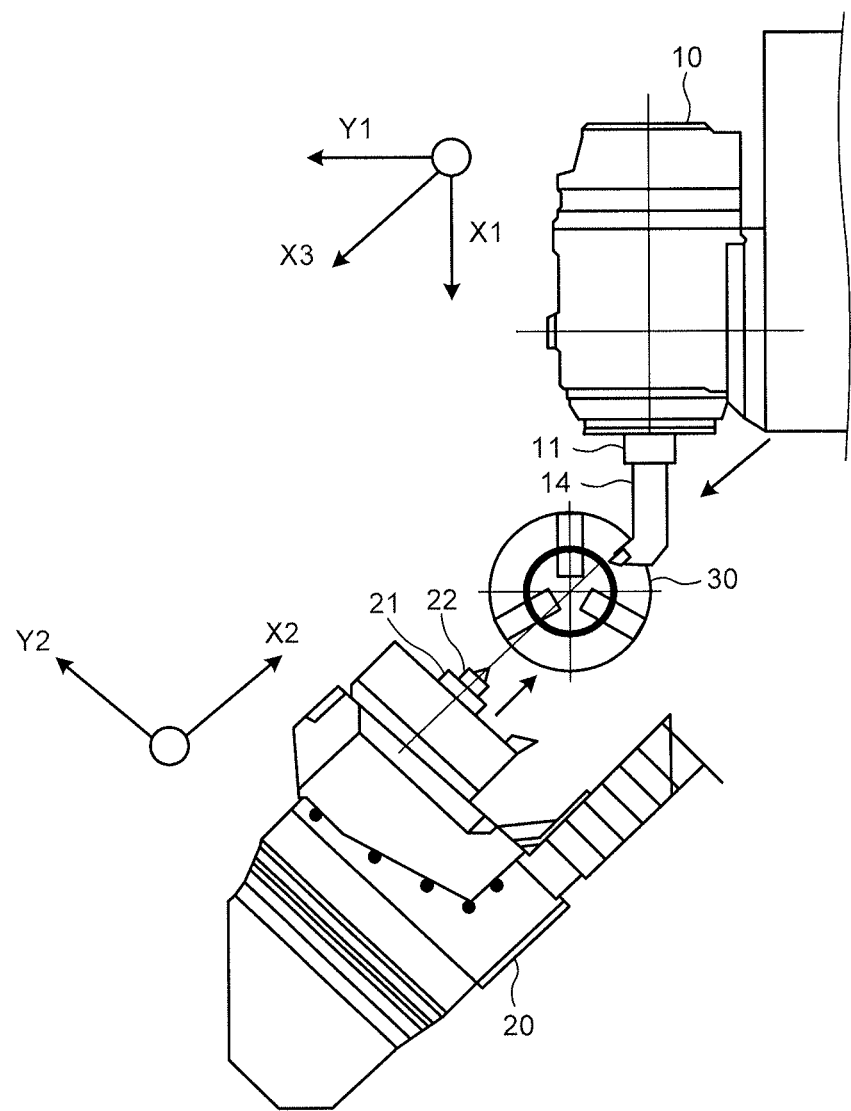
FIG. 4 is a diagram illustrating the configuration of a machine tool when balance cutting is performed by using a numerical control device in an embodiment of the present invention.
Figure 5:
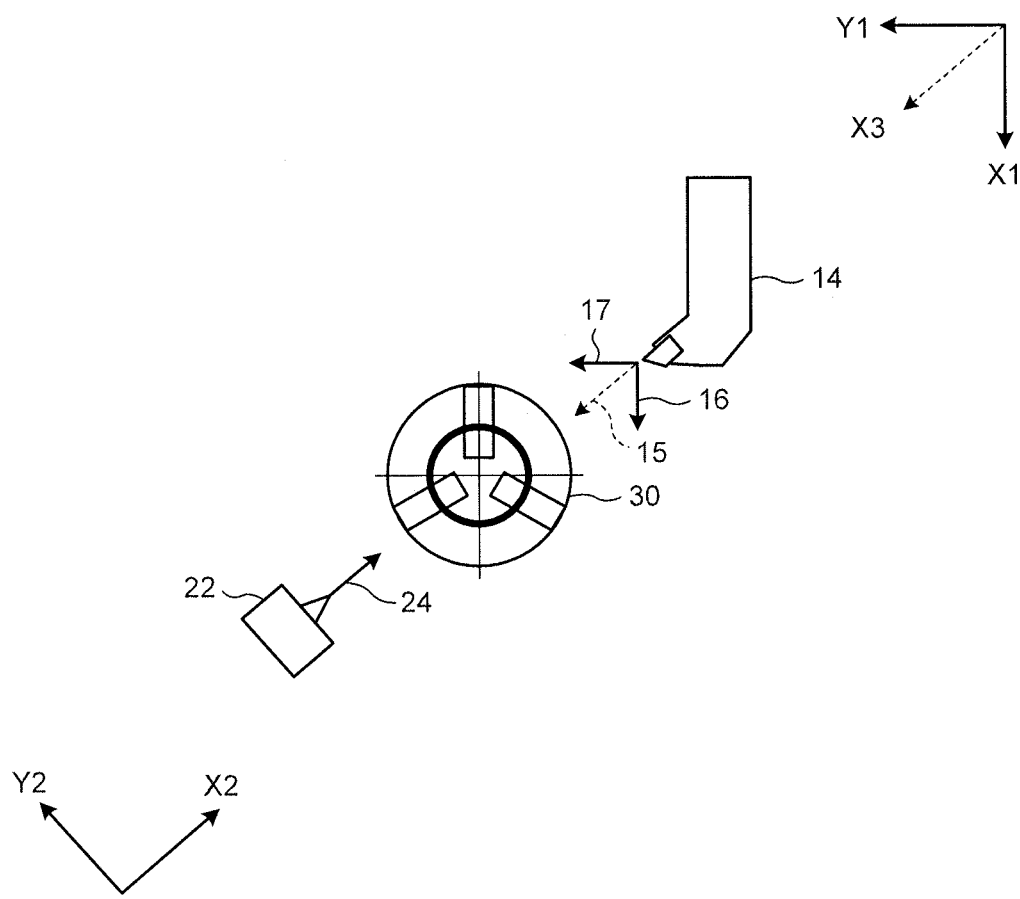
FIG. 5 is a diagram schematically explaining a state where the NC device in the embodiment of the present invention performs balance cutting.

FIG. 4 is a diagram illustrating the configuration of a machine tool when balance cutting is performed by using a numerical control device (hereinafter, an NC device) in an embodiment of the present invention. FIG. 5 is a diagram schematically explaining a state where the NC device in the embodiment of the present invention performs balance cutting by controlling the machine tool illustrated in FIG. 4.

As illustrated in FIG. 4, in the case where the NC device in the embodiment of the present invention performs balance cutting, an angle tool 14 is attached to the upper tool post 11.

The angle tool 14 has a tilt that removes the angular difference between the cutting shaft X1 of the upper tool post 11 and the cutting shaft X2 of the lower tool post 21. The angle tool 14 has a tilt that enables cutting to be performed in a direction opposite to the direction in which the lower tool post 21 performs cutting along a line aligned with the cutting shaft X2 of the lower tool post 21. As illustrated in FIG. 5, the NC device in the embodiment of the present invention can form an imaginary shaft X3 that moves along the same line as the X2 shaft by driving the X1 shaft and the Y1 shaft at the same time and can drive the upper tool post 11 with the X3 shaft as a cutting shaft. Specifically, in order to enable the imaginary shaft X3 to be moved by a movement amount 15, the NC device in the embodiment of the present invention decomposes the movement amount 15 of the imaginary shaft X3 into a movement amount 16 of the X1-shaft component and a movement amount 17 of the Y1-shaft component and drives the X1 shaft and the Y1 shaft by the movement amount 16 and the movement amount 17, respectively. The NC device in the embodiment of the present invention causes the upper tool post 11 to perform cutting in the X3-shaft direction and causes the lower tool post 21 to perform cutting in the X2-shaft direction in synchronization with the upper tool post 11. In other words, the NC device causes the X2 shaft to move by a movement amount 24, which is the same as the movement amount 15, in a direction opposed to the upper tool post 11. Consequently, even when the machine tool has a configuration in which the cutting shafts of the upper tool post 11 and the lower tool post 21 are not aligned, the NC device in the present embodiment of the present invention can cause the cutting directions of the upper and lower tool posts 11 and 21 to be aligned, enabling balance cutting to be realized.

In the specification, although the arrangement relation between the two tool posts is expressed as "upper and lower" for convenience sake, the positional relation between the two tool posts is not limited to the relation of "upper and lower" as long as the two tool posts oppose each other with the main shaft therebetween. For example, the two tool posts may be arranged in the horizontal direction with the main shaft therebetween.

Figure 6:
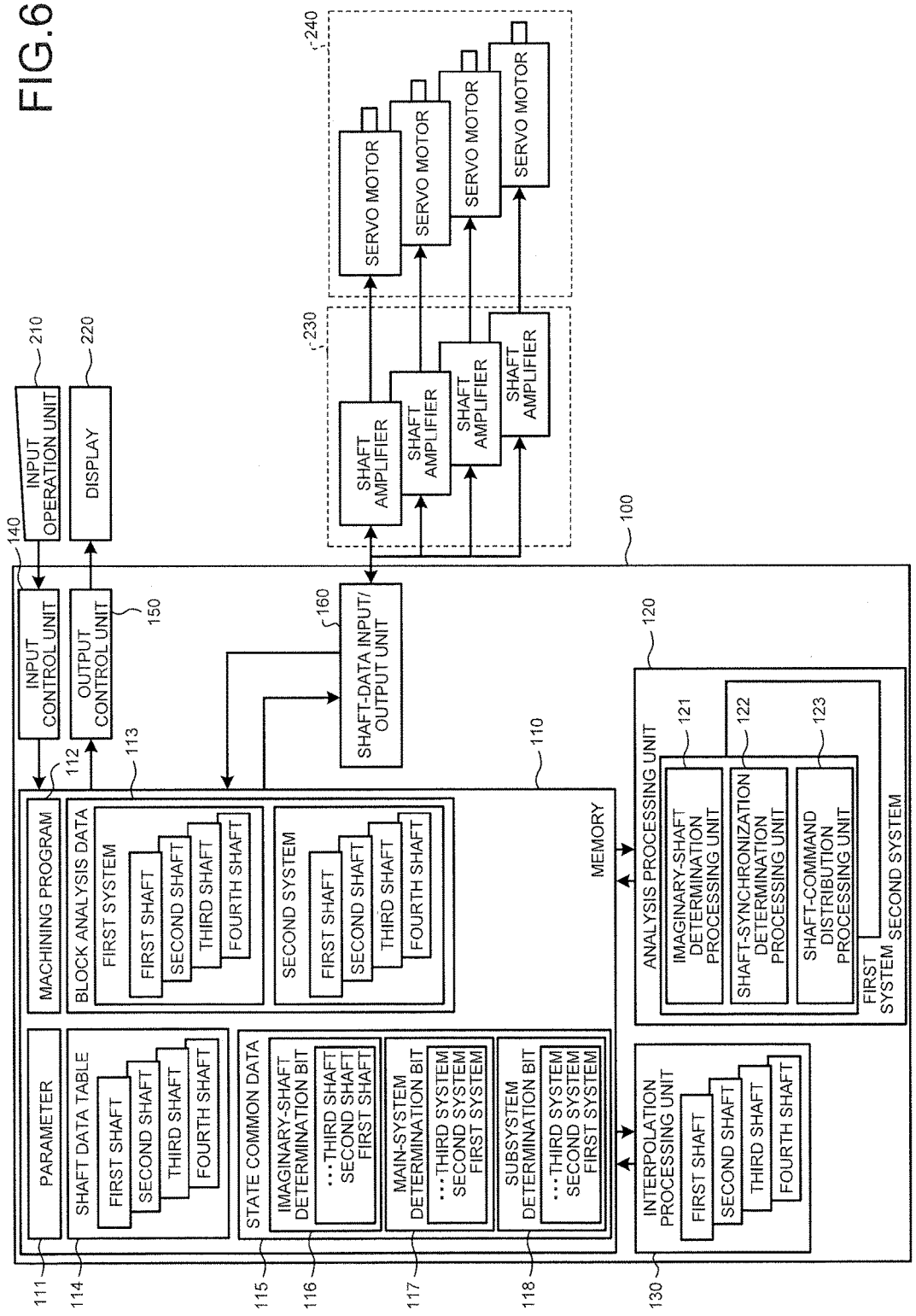
FIG. 6 is a diagram explaining the configuration of the NC device in the embodiment of the present invention.

FIG. 6 is a diagram explaining the configuration of the NC device in the embodiment of the present invention. As illustrated in FIG. 6, an NC device 100 is connected to an input operation unit 210, which is configured from a mouse, a keyboard, and the like and receives an input made by the operator, and a display 220, such as a liquid crystal display, that displays output information output to the operator. The NC device 100 is also connected to shaft amplifiers 230, which are for respective shafts and supply driving current to servo motors 240, which are for respective shafts and drive the shafts included in the machine tool.

The NC device 100 includes a memory 110, an analysis processing unit 120, an interpolation processing unit 130, an input control unit 140, an output control unit 150, and a shaft-data input/output unit 160.

The input control unit 140 is an interface that takes input signals from the input operation unit 210, and the output control unit 150 is an interface that outputs output information to the display 220.

The memory 110 stores in advance a parameter 111, which is machine configuration information including the machining conditions and the angular difference between the upper and lower tool posts, and a machining program 112 for machining a workpiece by numerically controlling the machine tool.

The angular difference between the upper and lower tool posts is an angular difference between the cutting shafts (X1, Y1) of the upper tool post 11 and the shaft (X2) that is used as the cutting shaft of the lower tool post 21 while the imaginary shaft control is being executed. When Y2 is used as the cutting shaft of the lower tool post 21 while the imaginary shaft control is being executed, the angular difference between each of X1 and Y1 and Y2 may be stored as the parameter 111. When an imaginary shaft is formed for the lower tool post 21, the angular difference between the cutting shafts (X2, Y2) of the lower tool post 21 and the shaft (any one or both of X1 and Y1) that is used as the cutting shaft of the upper tool post 11 while the imaginary shaft control is being executed may be stored as the parameter 111.

The memory 110 also stores, as intermediate data for numerical control, block analysis data 113 for each system, which is generated by analyzing the machining program 112 block by block, and a shaft data table 114, which is a list of the movement amount (shaft movement amount) per unit of time of each shaft. The shaft movement amounts that make up the shaft data table 114 are output to the shaft amplifiers 230 via the shaft-data input/output unit 160, which is a connection interface for the shaft amplifiers 230.

Furthermore, the memory 110 stores therein state common data 115, which is state information generated when the machining program 112 is being executed. The state common data 115 includes imaginary-shaft determination bits 116, which indicate a shaft forming an imaginary shaft when the imaginary shaft is set in the machining program 112, main-system determination bits 117, which indicate which system is the main system, and subsystem determination bits 118, which indicate which system is the subsystem. In this embodiment, the imaginary-shaft determination bit 116 is provided for each shaft and, when an imaginary shaft is set, the bit corresponding to the shaft forming the imaginary shaft changes to 1. The main-system determination bit 117 is provided for each system and the bit related to the system that is set as the main system changes to 1. The subsystem determination bit 118 has a configuration similar to that of the main-system determination bit 117.

The analysis processing unit 120 analyzes the machining program 112 and outputs the block analysis data 113. The analysis processing unit 120 includes, for each system, an imaginary-shaft determination processing unit 121, a shaft-synchronization determination processing unit 122, and a shaft-command distribution processing unit 123.

The imaginary-shaft determination processing unit 121 determines whether an imaginary shaft is set for the system that is to be processed by the imaginary-shaft determination processing unit 121. When an imaginary shaft is set for the system that is to be processed by the shaft-command distribution processing unit 123, the shaft-command distribution processing unit 123 distributes a movement command to move the imaginary shaft to the cutting shafts which form the imaginary shaft and are included in the system that is to be processed by the shaft-command distribution processing unit 123.

In order to move the main system and the subsystem in synchronization with each other, the shaft-synchronization determination processing unit 122 copies the movement command for the main system to the movement command for the subsystem. In this embodiment, as an example, an imaginary shaft is formed for the system that is set as the main system. Therefore, when the imaginary shaft control is valid, the shaft-synchronization determination processing unit 122 copies the movement command for the imaginary shaft to the movement command for the subsystem.

The interpolation processing unit 130 generates the shaft movement amount per unit of time and registers the generated shaft movement amounts in the shaft data table 114.

The shaft-synchronization determination processing unit 122 functions as a shaft-synchronization processing unit in cooperation with the interpolation processing unit 130. The shaft-synchronization processing unit causes the tool post for which the imaginary shaft is formed to perform cutting in the direction of the imaginary shaft by driving the actual shafts in accordance with the movement commands distributed to the actual shaft components, respectively. In addition to causing the tool post for which the imaginary shaft is formed to perform cutting, the shaft-synchronization processing unit causes the cutting shaft of the subsystem, which moves along the same line as the imaginary shaft, to perform cutting by the same movement amount as the movement amount in the direction of the imaginary shaft in synchronization with the tool post for which the imaginary shaft is formed. Consequently, balance cutting using the imaginary shaft can be realized.

Figure 7:
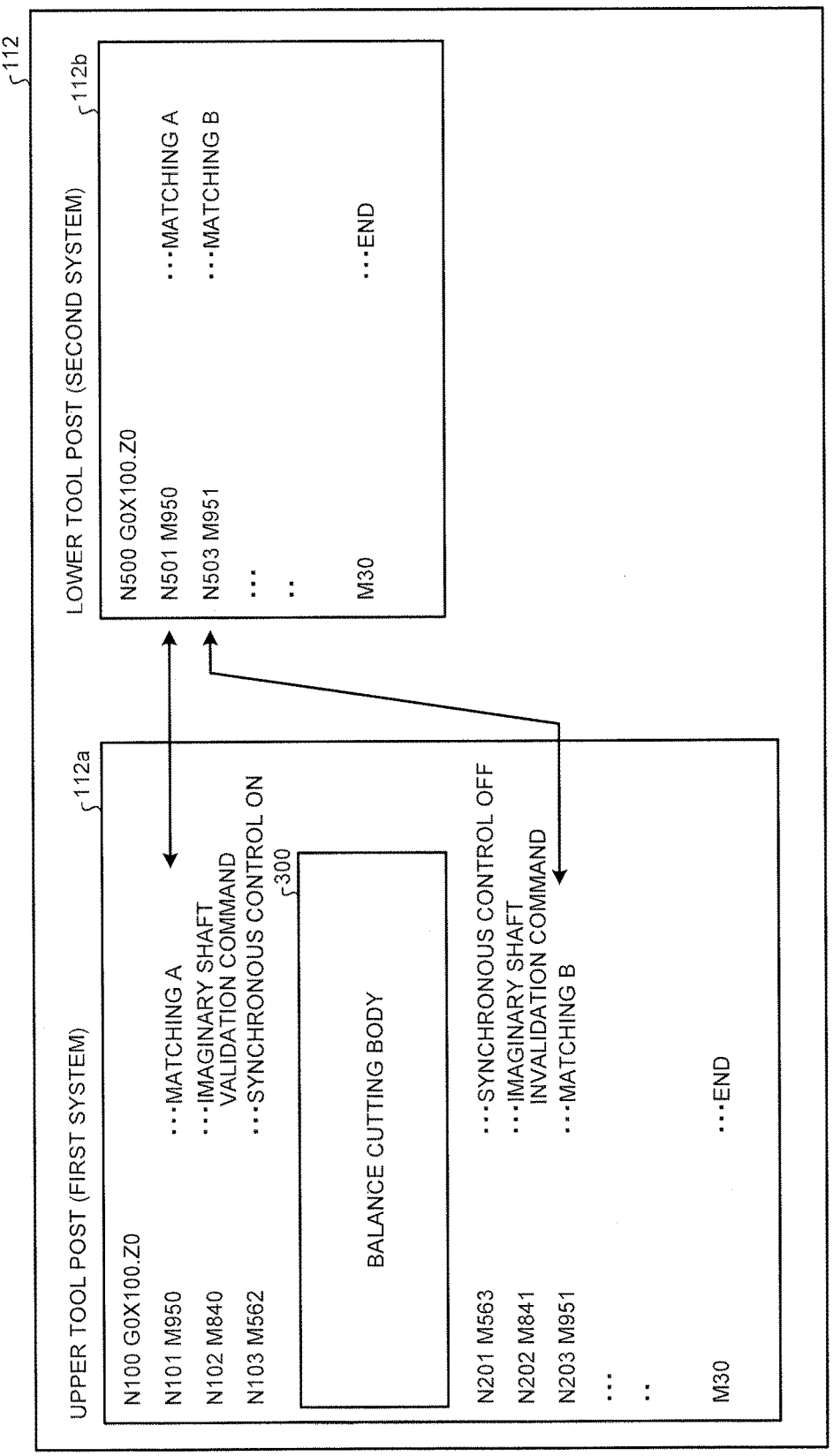
FIG. 7 is a diagram illustrating an example of a machining program.

An example of the machining program 112 will be explained here. FIG. 7 is a diagram illustrating an example of the machining program 112. As illustrated in FIG. 7, the machining program 112 includes a machining program 112a for the upper tool post 11 and a machining program 112b for the lower tool post 21 set in the second system. In this example, the upper tool post 11 is set as the first system and the lower tool post 21 is set as the second system.

The machining program 112 is such that the machining programs 112a and 112b are executed simultaneously and sequentially block by block by the analysis processing unit 120 included in each system. The machining program 112a is configured to include a program (balance cutting body 300) for positioning the imaginary shaft. In the balance cutting body 300, the content for moving the X1 shaft, which is a representative shaft among the cutting shafts that are formed for the upper tool post 11, is written. The analysis processing unit 120 interprets the movement command for the X1 shaft as the movement command for the imaginary shaft X3.

N100/N500 are commands to perform positioning before balance cutting is performed. N101/N501 are commands to cause the execution positions to match between the machining program 112a for the upper tool post 11 and the machining program 112b for the lower tool post 21. Consequently, the upper tool post 11 and the lower tool post 21 enter a state in which balance cutting can be started.

N102 is a command (imaginary shaft validation command) to validate the movement command for the imaginary shaft. When the analysis processing unit 120 reads this command, the shaft-command distribution processing unit 123 interprets the movement command for the representative shaft (X1 shaft) included in the subsequent balance cutting body 300 as the movement command for the imaginary shaft X3 and distributes the movement command for the imaginary shaft X3 to the movement command component of the X1 shaft and the movement command component of the Y1 shaft.

N103 is a command (synchronous command) to shift to the synchronous control mode. When the analysis processing unit 120 reads the synchronous command, the shaft-synchronization determination processing unit 122 copies the movement command for the X1 shaft included in the balance cutting body 300 and interprets the copied movement command as the movement command for the cutting shaft X2 of the lower tool post 21. In other words, the shaft-synchronization determination processing unit 122 can move the X2 shaft by using the movement command for the X1 shaft and, as a result, can move the X2 shaft by the same movement amount as the movement amount of the imaginary shaft.

N201 is a command to invalidate the synchronous control and N202 is a command to invalidate the movement command for the imaginary shaft. After the balance cutting body 300 is executed, the synchronous control and the imaginary shaft control are invalidated by N201 and N202, respectively. N203/N503 are commands to cause the points in time at which balance cutting ends to match between the machining program 112a and the machining program 112b. After the points in time match due to this command being used, the upper tool post 11 and the lower tool post 21 are independently controlled in accordance with the machining program 112a and the machining program 112b, respectively.

One or both of the analysis processing unit 120 and the interpolation processing unit 130 is realized, for example, by the CPU executing a predetermined program. One or both of the analysis processing unit 120 and the interpolation processing unit 130 may be configured from a hardware circuit, such as an ASIC.

Figure 8:
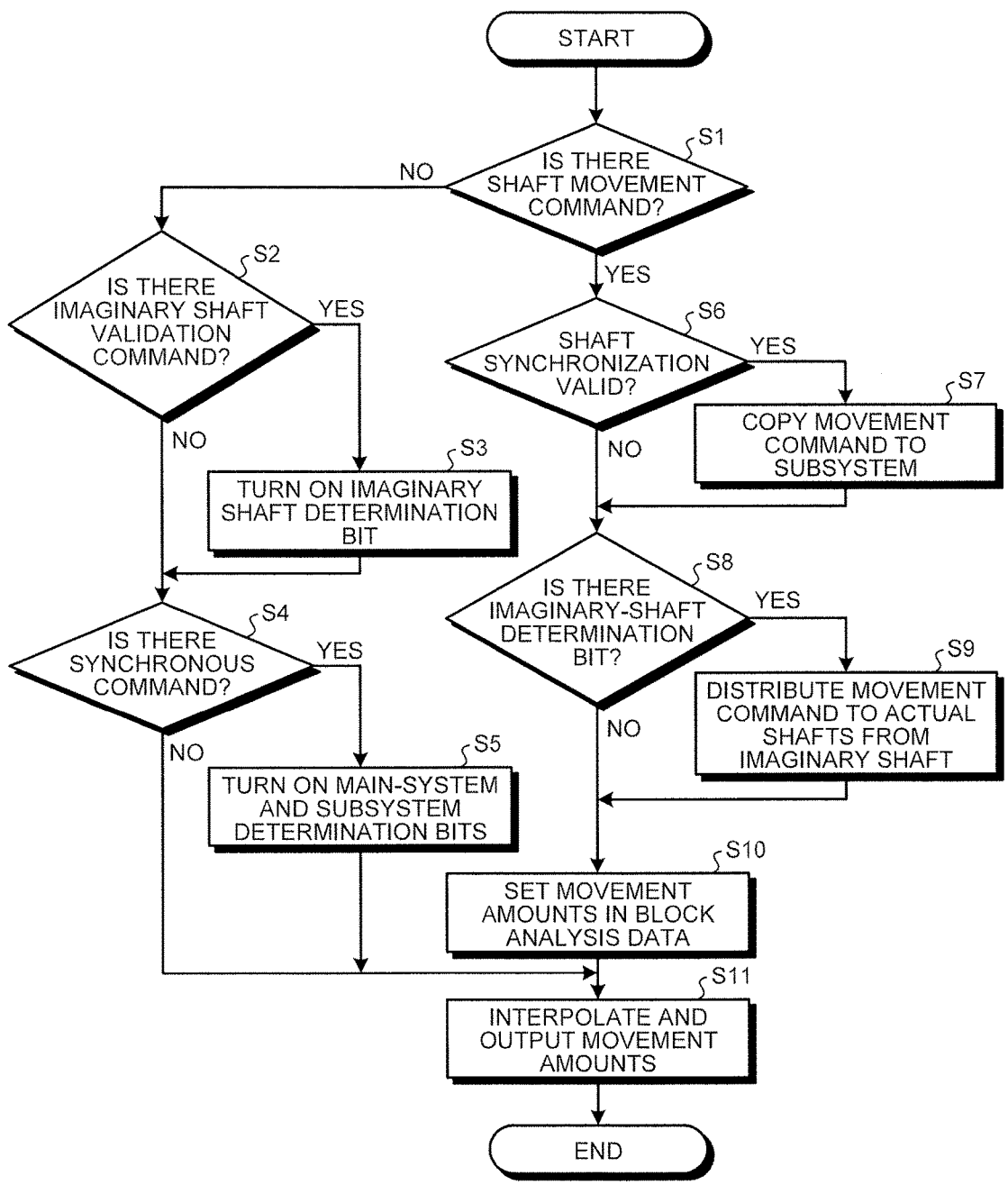
FIG. 8 is a flowchart explaining the operation of the NC device in the embodiment of the present invention.

FIG. 8 is a flowchart explaining the operation of the NC device 100. This flowchart is executed for each of the blocks from which the machining program 112 is configured. The processes at Step S1 to Step S10 are performed independently on each system.

First, the analysis processing unit 120 determines whether the read block includes a shaft movement command (Step S1). The presence or absence of a shaft movement command can be determined by analyzing whether a shaft address with a movement command is present or absent in one block.

When the read block does not include a shaft movement command (No at Step S1), the analysis processing unit 120 determines whether the block includes an imaginary shaft validation command (Step S2). When the block includes an imaginary shaft validation command (Yes at Step S2), the analysis processing unit 120 validates the imaginary shaft determination bit 116 of the shaft forming the imaginary shaft (Step S3). When the block does not include an imaginary shaft validation command (No at Step S2), the analysis processing unit 120 skips the process at Step S3.

Next, the analysis processing unit 120 determines whether the read block includes a synchronous command (Step S4). When the block includes a synchronous command (Yes at Step S4), the analysis processing unit 120 validates the main-system determination bit 117 and the subsystem determination bit 118 (Step S5). Specifically, when the block including the synchronous command is written in the machining program 112a, which controls the upper tool post 11, the analysis processing unit 120 sets the upper tool post 11 as the main system and sets the lower tool post 21 as the subsystem. When the block including the synchronous command is written in the machining program 112b, which controls the lower tool post 21, the analysis processing unit 120 sets the upper tool post 11 as the subsystem and sets the lower tool post 21 as the main system. When the read block does not include a synchronous command (No at Step S4), the analysis processing unit 120 skips the process at Step S5.

When the read block includes a shaft movement command (Yes at Step S1), the shaft-synchronization determination processing unit 122 refers to the main-system determination bit 117 and the subsystem determination bit 118 and determines whether there is a valid bit in each of the main-system determination bit 117 and the subsystem determination bit 118 (Step S6). When there is a valid bit in the main-system determination bit 117 and the subsystem determination bit 118 (Yes at Step S6), the shaft-synchronization determination processing unit 122 copies the block analysis data 113 corresponding to the movement command (i.e., the movement command included in the balance cutting body 300) for the main system included in the read block to the block analysis data 113 of the subsystem (Step S7). When there is no valid bit in the main-system determination bit 117 and the subsystem determination bit 118 (No at Step S6), the shaft-synchronization determination processing unit 122 skips the process at Step S7.

Next, the imaginary-shaft determination processing unit 121 refers to the imaginary-shaft determination bit 116 to determine whether a shaft set as an imaginary shaft is present (Step S8). When there is a shaft set as an imaginary shaft (Yes at Step S8), the shaft-command distribution processing unit 123 distributes the movement command for the imaginary shaft in the block analysis data 113 to the actual shafts in accordance with the angular difference information on the angular difference between the upper and lower tool posts, which is included in the parameter 111 (Step S9). When there is no shaft set as an imaginary shaft (No at Step S8), the process at Step S9 is skipped.

Then, the analysis processing unit 120 sets the movement amounts in the block analysis data 113 (Step S10).

When the read block does not include a synchronous command (No at Step S4), after the process at Step S5 or the process at Step S10, the interpolation processing unit 130 performs an interpolation process on the basis of the block analysis data 113 (Step S11). Specifically, the interpolation processing unit 130 calculates the shaft movement amount of each shaft per unit of time and registers the calculated shaft movement amounts in the shaft data table 114. Thereafter, the shaft movement amounts per unit of time are supplied to the shaft amplifiers 230 by the shaft-data input/output unit 160, whereby the servo motors 240 are driven by the shaft amplifiers 230.

As described above, according to the embodiment of the present invention, the NC device 100 is configured to include the memory 110 that stores in advance the parameter 111, which includes angular difference information, and the machining program 112, which includes the balance cutting body 300 in which a movement command for an imaginary shaft is written; the shaft-command distribution processing unit 123 that distributes a movement command to move an imaginary shaft to the actual shaft components in accordance with the angular difference information included in the parameter 111; and the shaft-synchronization determination processing unit 122 and the interpolation processing unit 130, functioning as a shaft-synchronization processing unit, that cause the tool post for which the imaginary shaft is formed to perform cutting in the direction of the imaginary shaft by driving the actual shafts in accordance with the movement commands distributed to the actual shaft components, respectively, and that cause the cutting shaft that moves along the same line as the imaginary shaft among the cutting shafts formed for the tool post opposed to the tool post for which the imaginary shaft is formed to perform cutting by the same movement amount as the imaginary shaft in a direction opposite to the imaginary shaft. The NC device 100 can cause the cutting shaft that moves along the same line as the imaginary shaft among the cutting shafts formed for the tool post opposed to the tool post for which the imaginary shaft is formed to perform cutting by the same movement amount as the imaginary shaft in a direction opposite to the imaginary shaft in synchronization with the imaginary shaft; therefore, a machine tool in which the moving directions of the cutting shafts of two tool posts that oppose each other with a main shaft therebetween are not aligned can be numerically controlled to realize balance cutting.

Moreover, the shaft-synchronization processing unit interprets a movement command to move an imaginary shaft as a movement command for a cutting shaft that performs cutting in a direction opposite to the imaginary shaft along the same line as the imaginary shaft, thereby driving the cutting shaft; therefore, with the NC device 100, it is not necessary for the user to write in advance a movement command for the cutting shaft in the machining program 112b in order to realize balance cutting. In other words, it is possible to reduce the workload on the user for creating the machining program 112.

Furthermore, the movement command for an imaginary shaft is expressed by a movement command to move a representative shaft among the cutting shafts of the tool post for which the imaginary shaft is formed and the shaft-synchronization processing unit is configured to be able to interpret the movement command for the representative shaft as the movement command for the imaginary shaft. Therefore, with the NC device 100, it is not necessary for the user to distribute the movement command for the imaginary shaft to the actual shafts to create the machining program 112. In other words, it is possible to reduce the workload on the user for creating the machining program 112.

INDUSTRIAL APPLICABILITY

As described above, the numerical control device and the machining method according to the present invention are preferably used as a numerical control device that numerically controls a machine tool that performs turning by using two tool posts opposing each other with a main shaft therebetween and a machining method performed by the numerical control device.

REFERENCE SIGNS LIST 10 upper-tool-post driving unit, 11 upper tool post, 12 cutting tool, 13, 23, 40 vector, 14 angle tool, 15 to 17, 24 movement amount, 20 lower-tool-post driving unit, 21 lower tool post, 22 cutting tool, 30 main shaft, 100 numerical control device, 110 memory, 111 parameter, 112, 112a, 112b machining program, 113 block analysis data, 114 shaft data table, 115 state common data, 116 imaginary-shaft determination bit, 117 main-system determination bit, 118 subsystem determination bit, 120 analysis processing unit, 121 imaginary-shaft determination processing unit, 122 shaft-synchronization determination processing unit, 123 shaft-command distribution processing unit, 130 interpolation processing unit, 140 input control unit, 150 output control unit, 160 shaft-data input/output unit, 210 input operation unit, 220 display, 230 shaft amplifier, 240 servo motor, 300 balance cutting body.

The invention claimed is:

1. A numerical control device controlling a machine tool that includes two tool posts opposing each other with a main shaft therebetween, in which one tool post among the two tool posts includes a plurality of first cutting shafts that are perpendicular to the main shaft, in which another tool post among the two tool posts includes one second cutting shaft that is perpendicular to the main shaft, and in which each of the first cutting shafts and the second cutting shaft are arranged such that there is an angular difference between each of the first cutting shafts and the second cutting shaft, the device comprising:
 a memory that stores in advance angular difference information on an angular difference between each of the first cutting shafts and the second cutting shaft and a machining program that includes a movement command for the one tool post to move an imaginary shaft, which moves along a same line as the second cutting shaft and performs cutting from a direction opposite to the second cutting shaft with respect to the main shaft;
 a shaft-command distribution processing unit that distributes a movement command to move the imaginary shaft to the first cutting shaft components in accordance with the angular difference information; and
 a shaft-synchronization processing unit that causes the one tool post to perform cutting in a direction of the imaginary shaft by driving each of the first cutting shafts in accordance with each movement command distributed to the first cutting shaft components and causes the another tool post to perform cutting in a direction opposite to the direction of the imaginary shaft by driving the second cutting shaft by a movement amount same as a movement amount in the direction of the imaginary shaft.

2. The numerical control device according to claim 1, wherein the shaft-synchronization processing unit drives the second cutting shaft by interpreting a movement command to move the imaginary shaft as a movement command to move the second cutting shaft.

3. A machining method of machining a workpiece by numerically controlling a machine tool that includes two tool posts opposing each other with a main shaft therebetween, in which one tool post among the two tool posts includes a plurality of first cutting shafts that are perpendicular to the main shaft, in which another tool post among the two tool posts includes one second cutting shaft that is perpendicular to the main shaft, and in which each of the first cutting shafts and the second cutting shaft are arranged such that there is an angular difference between each of the first cutting shafts and the second cutting shaft, the method comprising:
 reading a movement command for the one tool post to move an imaginary shaft, which moves along a same line as the second cutting shaft and performs cutting from a direction opposite to the second cutting shaft with respect to the main shaft;
 distributing read movement command to move the imaginary shaft to the first cutting shaft components in accordance with the angular difference between each of the first cutting shafts and the second cutting shaft; and
 causing the one tool post to perform cutting in a direction of the imaginary shaft by driving each of the first cutting shafts in accordance with each movement command distributed to the first cutting shaft components and causing the another tool post to perform cutting in a direction opposite to the direction of the imaginary shaft by driving the second cutting shaft by a movement amount same as a movement amount in the direction of the imaginary shaft.

4. The machining method according to claim 3, further comprising copying a movement command to move the imaginary shaft to a movement command for the second cutting shaft, wherein
 the causing includes driving the second cutting shaft in accordance with copied movement command.

* * * * *